United States Patent
Sohn et al.

(10) Patent No.: US 11,484,945 B2
(45) Date of Patent: Nov. 1, 2022

(54) METHOD OF FEEDBACK CONTROLLING 3D PRINTING PROCESS IN REAL-TIME AND 3D PRINTING SYSTEM FOR THE SAME

(71) Applicant: Korea Advanced Institute of Science and Technology, Daejeon (KR)

(72) Inventors: Hoon Sohn, Daejeon (KR); Ikgeun Jeon, Daejeon (KR); Peipei Liu, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 54 days.

(21) Appl. No.: 17/124,973

(22) Filed: Dec. 17, 2020

(65) Prior Publication Data
US 2021/0197283 A1 Jul. 1, 2021

(30) Foreign Application Priority Data
Dec. 31, 2019 (KR) .................. 10-2019-0179192

(51) Int. Cl.
*B22F 10/85* (2021.01)
*B22F 10/25* (2021.01)
(Continued)

(52) U.S. Cl.
CPC .............. *B22F 10/85* (2021.01); *B22F 10/25* (2021.01); *B22F 10/36* (2021.01); *B22F 12/41* (2021.01);
(Continued)

(58) Field of Classification Search
CPC .......... B22F 10/85; B22F 10/25; B22F 10/36; B22F 12/41; B22F 12/90; B22F 10/368; B33Y 50/02; B33Y 10/00; B33Y 30/00; G06T 7/0004; G06T 7/50; G06T 2207/10048; G06T 2207/20081; G06T 2207/20084; G06T 2207/30164;
(Continued)

(56) References Cited

U.S. PATENT DOCUMENTS

| 2018/0029126 A1 | 2/2018 | Ng et al. |
| 2020/0121376 A1* | 4/2020 | Zhang .................. G06N 3/0454 |

(Continued)

FOREIGN PATENT DOCUMENTS

| JP | 2018-100954 A | 6/2018 |
| JP | 2019-534186 A | 11/2019 |

*Primary Examiner* — Bobbak Safaipour
(74) *Attorney, Agent, or Firm* — Daly, Crowley, Mofford & Durkee, LLP

(57) ABSTRACT

A method of feedback controlling a 3D printing process in real time, and a system therefor are disclosed. The method includes collecting big data, generated through 3D printing experiments, related to process variables of 3D printing, measurement signals, and 3D printing quality of the 3D printing object; building an artificial neural network model by performing machine-learning based on the collected big data; evaluating whether or not a 3D printing quality of the 3D printing object is abnormal in real time based on an actual measurement signal of the 3D printing object and the artificial neural network model; and feedback controlling printing quality of the 3D printing object in real time based on the evaluation result of whether or not the 3D printing quality of the 3D printing object is abnormal.

14 Claims, 11 Drawing Sheets

(51) Int. Cl.
  *B22F 10/36* (2021.01)
  *B22F 12/41* (2021.01)
  *B22F 12/90* (2021.01)
  *B33Y 50/02* (2015.01)
  *G06T 7/00* (2017.01)
  *G06T 7/50* (2017.01)
  *B33Y 10/00* (2015.01)
  *B33Y 30/00* (2015.01)

(52) U.S. Cl.
  CPC .............. *B22F 12/90* (2021.01); *B33Y 50/02* (2014.12); *G06T 7/0004* (2013.01); *G06T 7/50* (2017.01); *B33Y 10/00* (2014.12); *B33Y 30/00* (2014.12); *G06T 2207/10048* (2013.01); *G06T 2207/20081* (2013.01); *G06T 2207/20084* (2013.01); *G06T 2207/30164* (2013.01)

(58) Field of Classification Search
  CPC . G01J 5/0037; G01J 2005/0077; Y02P 10/25; G01B 17/02; G01B 21/085
  See application file for complete search history.

(56) References Cited

U.S. PATENT DOCUMENTS

2021/0197282 A1* 7/2021 Sohn .......................... G06T 7/50
2021/0197287 A1* 7/2021 Sohn ....................... B22F 10/22

* cited by examiner

METHOD OF FEEDBACK CONTROLLING 3D PRINTING PROCESS IN REAL-TIME AND 3D PRINTING SYSTEM FOR THE SAME

CROSS-REFERENCE TO RELATED APPLICATION

This U.S. non-provisional application claims priority under 35 USC § 119 from Korean Patent Application No. 10-2019-0179192, filed on Dec. 31, 2019 in the Korean Intellectual Property Office (KIPO), the disclosure of which is hereby incorporated by reference in its entirety.

BACKGROUND

1. Technical Field

The present disclosure relates to a three dimensional (3D) printing system and method, and more particularly, to a 3D printing system and a method capable of feedback controlling a 3D printing process in real-time.

2. Description of the Related Art

The 3D printing is known as a manufacturing technology for producing a 3D object. For the 3D printing of the 3D object, it is processed in a way that stacks layer by layer based on the 3D model data processing information. The 3D printing technology has advantages that facilitate realization of a complex shape, a shape formed inside a product, etc. Due to these advantages, the 3D printing technology is in the spotlight as a high value-added technology that makes it easy to manufacture various products such as various industrial parts and medical materials.

The 3D printing process can be performed by dividing the shape of a 3D product into a number of 2D cross sections having a uniform or variable thickness, and forming the 2D cross sections to be stacked one by one. There are several known 3D printing methods such as a material extrusion method, a material jetting method, a binder jetting method, a sheet lamination method, a vat photo-polymerization method, a powder bed fusion method, a directed energy deposition (DED) method, etc. Among them, the DED method is a method of applying laser energy to metal powder or wire material to be melted and fused, and is widely used because of its advantages that it can use inexpensive commercial materials compared to other methods, form a lamination on existing 3D shapes, and have superior mechanical properties compared to other methods.

In the 3D printing according to the DED method, a molten pool is formed when a laser beam irradiated from a laser source is irradiated to the substrate, and metal powder is supplied onto the molten pool to form a lamination.

The physical property, shape, and defect of the 3D printing object are important factors that determine the quality of the 3D printing. It is a necessary technology to improve the 3D printing quality to evaluate the 3D printing quality by inspecting the physical property, shape, and defect of the 3D printing object, and control the 3D printing process based on the evaluation result. However, no technology has been developed to control the process by evaluating the 3D printing quality in real time and feeding the evaluation result back.

SUMMARY

In order to solve the problems of the prior art as above, embodiments of the present disclosure are to provide a 3D printing system and method capable of evaluating 3D printing quality in real time during the 3D printing process and performing feedback process control based on the evaluation result.

In one aspect, some embodiments of the present disclosure provide a method of feedback controlling a 3D printing process in real-time during the 3D printing process in which a base material supplied to a 3D printing object is melted by a laser source for 3D printing and printed to form a 3D object. The method includes collecting big data, generated through 3D printing experiments, related to process variables of 3D printing, measurement signals, and 3D printing quality of the 3D printing object; building an artificial neural network model by performing machine-learning based on the collected big data; evaluating whether or not a 3D printing quality of the 3D printing object is abnormal in real time based on an actual measurement signal of the 3D printing object and the artificial neural network model; and feedback controlling printing quality of the 3D printing object in real time based on the evaluation result of whether or not the 3D printing quality of the 3D printing object is abnormal. The 'collecting the big data' includes collecting the process variables of 3D printing; measuring a thermal image and an ultrasonic signal for the 3D printing object; estimating 3D printing quality by analyzing the collected process variables and the measured thermal image and the ultrasonic signal; and collecting big data related to the estimated 3D printing quality in real time during the 3D printing process.

In an embodiment, the method may be performed in a state in which a thermal imaging camera for taking a thermal image of the 3D printing object and a laser ultrasonic device for measuring the ultrasonic signal are disposed coaxially with the laser source for 3D printing.

In an embodiment, the 'estimating 3D printing quality' may include estimating a physical property or shape of the 3D printing object based on at least one of an arrival time and a wave velocity of a responsive ultrasonic wave, and a thermal energy transfer velocity in the thermal image.

In an embodiment, the 'estimating 3D printing quality' may include detecting presence of a defect in the 3D printing object based on at least one of an additional reflection wave, an arrival time, and a wave velocity of a responsive ultrasonic wave, and a change in thermal energy distribution in the thermal image.

In an embodiment, the artificial neural network model may be built by machine-learning correlations between data of the process variables and data of the 3D printing quality, and configured to estimate a predicted value of the 3D printing quality when new data of the process variables are provided as input data.

In an embodiment, the artificial neural network model may be built by machine-learning correlations between the measurement signals and data of the 3D printing quality, and configured to estimate a predicted value of the 3D printing quality when a new measurement signal is provided as input data.

In an embodiment, the 'evaluating whether or not a 3D printing quality of the 3D printing object is abnormal' may include: deriving a prediction value of the 3D printing quality by inputting a thermal image and an ultrasonic signal, which are newly measured, of the 3D printing object into the artificial neural network model; acquiring an actual measurement value of 3D printing quality by analyzing an actual measurement signal related to the 3D printing object; calculating an error between the prediction value of 3D printing quality derived through the artificial neural network model and the actual measurement value of 3D printing quality; and determining that the 3D printing quality is abnormal when the error calculated exceeds a predetermined tolerance threshold.

In an embodiment, the 'evaluating whether or not a 3D printing quality of the 3D printing object is abnormal' may include monitoring the actual measurement value of the 3D printing quality; and determining that the 3D printing quality is abnormal when the actual measurement value of the 3D printing quality is not a value within a predetermined allowable range.

In an embodiment, the 'evaluating whether or not a 3D printing quality of the 3D printing object is abnormal' may include monitoring whether or not a defect including at least one of an internal void and a surface crack is generated in the 3D printing object by analyzing a thermal image and an ultrasonic signal; and determining that the 3D printing quality is abnormal when existence of the defect is estimated.

In an embodiment, the feedback controlling of printing quality of the 3D printing object may include: inspecting whether or not the printing quality is normal; performing a feedback control in real-time when the printing quality is abnormal; and adjusting data of process variables of the 3D printing process through a real-time feedback control.

In an embodiment, the process variables may be actively adjusted in the 3D printing process and may include at least one of an intensity of the laser beam for the 3D printing, a process speed, a size of the laser beam for the 3D printing, and a discharge amount of the base material.

In an embodiment, the 3D printing quality may include at least one of physical property, defect, and shape of the 3D printing object.

In an embodiment, the measurement signal may include at least one of a thermal image, an ultrasonic signal, a vision camera image, and a sound signal.

In an embodiment, the 3D printing process may be a direct energy deposition (DED) based 3D printing process.

In another aspect, some embodiments of the present disclosure provide a 3D printing system capable of real-time feedback control of a 3D printing process. The 3D printing system includes a laser source, a base material supply source, a thermal imaging camera, a laser ultrasonic device, and a control unit. The laser source is configured to form a molten pool in a 3D printing object by irradiating a laser beam to melt a base material supplied to the 3D printing object. The base material supply source is configured to supply the base material onto the 3D printing object. The thermal imaging camera is configured to acquire a thermal image of the molten pool formed on the 3D printing object. The laser ultrasonic device is configured to receive a laser ultrasound wave reflected from the 3D printing object. The control unit is configured to perform the functions of: collecting big data, generated through 3D printing experiments, related to process variables of 3D printing, measurement signals, and 3D printing quality of the 3D printing object; building an artificial neural network model by performing machine-learning based on the collected big data; evaluating whether or not a 3D printing quality of the 3D printing object is abnormal in real time based on an actual measurement signal of the 3D printing object and the artificial neural network model; and feedback controlling printing quality of the 3D printing object in real time based on the evaluation result of whether or not the 3D printing quality of the 3D printing object is abnormal. The function of collecting the big data includes the sub-functions of: collecting the process variables of 3D printing; measuring a thermal image and an ultrasonic signal for the 3D printing object; estimating 3D printing quality by analyzing the collected process variables and the measured thermal image and the ultrasonic signal; and collecting big data related to the estimated 3D printing quality in real time during the 3D printing process. The thermal imaging camera and the laser ultrasonic device are disposed coaxially with the laser source for 3D printing.

In an embodiment, the process variables may be actively adjusted in the 3D printing process and may include at least one of an intensity of the laser beam for the 3D printing, a process speed, a size of the laser beam for the 3D printing, and a discharge amount of the base material.

In an embodiment, the function of 'evaluating whether or not a 3D printing quality of the 3D printing object is abnormal' may include the sub-functions of: deriving a prediction value of the 3D printing quality by inputting a thermal image and an ultrasonic signal, which are newly measured, of the 3D printing object into the artificial neural network model; acquiring an actual measurement value of 3D printing quality by analyzing an actual measurement signal related to the 3D printing object; calculating an error between the prediction value of 3D printing quality derived through the artificial neural network model and the actual measurement value of 3D printing quality; and determining that the 3D printing quality is abnormal when the error calculated exceeds a predetermined tolerance threshold.

In an embodiment, the process variable may be actively adjusted in the 3D printing process, and may include at least one of an intensity of a laser beam, a process speed, a size of a laser beam, and an ejection amount of the base powder.

In an embodiment, the artificial neural network model may be built by machine-learning correlations between data of the process variables and data of the 3D printing quality, and configured to estimate a predicted value of the 3D printing quality when new data of the process variables are provided as input data.

In an embodiment, the artificial neural network model may be built by machine-learning correlations between measurement signals and data of the 3D printing quality, and configured to estimate a predicted value of the 3D printing quality when a new measurement signal is provided as input data.

According to the embodiments of the present disclosure, the printing quality of the 3D printing object formed during the 3D printing process is estimated in real time using a thermal imaging camera and an ultrasonic device, and the correlation between the process variables used for 3D printing and the 3D printing quality is analyzed. Based on the evaluation and analysis, effective feedback process control is possible.

According to the embodiments of the present disclosure, an artificial neural network model is constructed based on the result of analyzing the correlation between the process variables used for 3D printing and the 3D printing quality during the 3D printing process. A 3D printing quality for the 3D printing process currently performed can be determined through the artificial neural network model. After obtaining a prediction value of the 3D printing quality using the artificial neural network model, it is possible to easily discriminate an abnormality in the 3D printing quality by comparing the prediction value of the 3D printing quality with an actually measured value of the 3D printing quality.

In addition, according to the embodiments of the present disclosure, when the printing quality of the 3D printing process is determined to be abnormal, the printing quality of the 3D printing object can be controlled in real-time by adjusting the 3D printing process variables according to the correlation, analyzed through the artificial neural network model, between the process variables and the 3D printing quality.

According to the embodiments of the present disclosure, since the process control is performed in real time while controlling the 3D printing process variables, quality of the 3D printing object can be improved and process efficiency can be increased.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
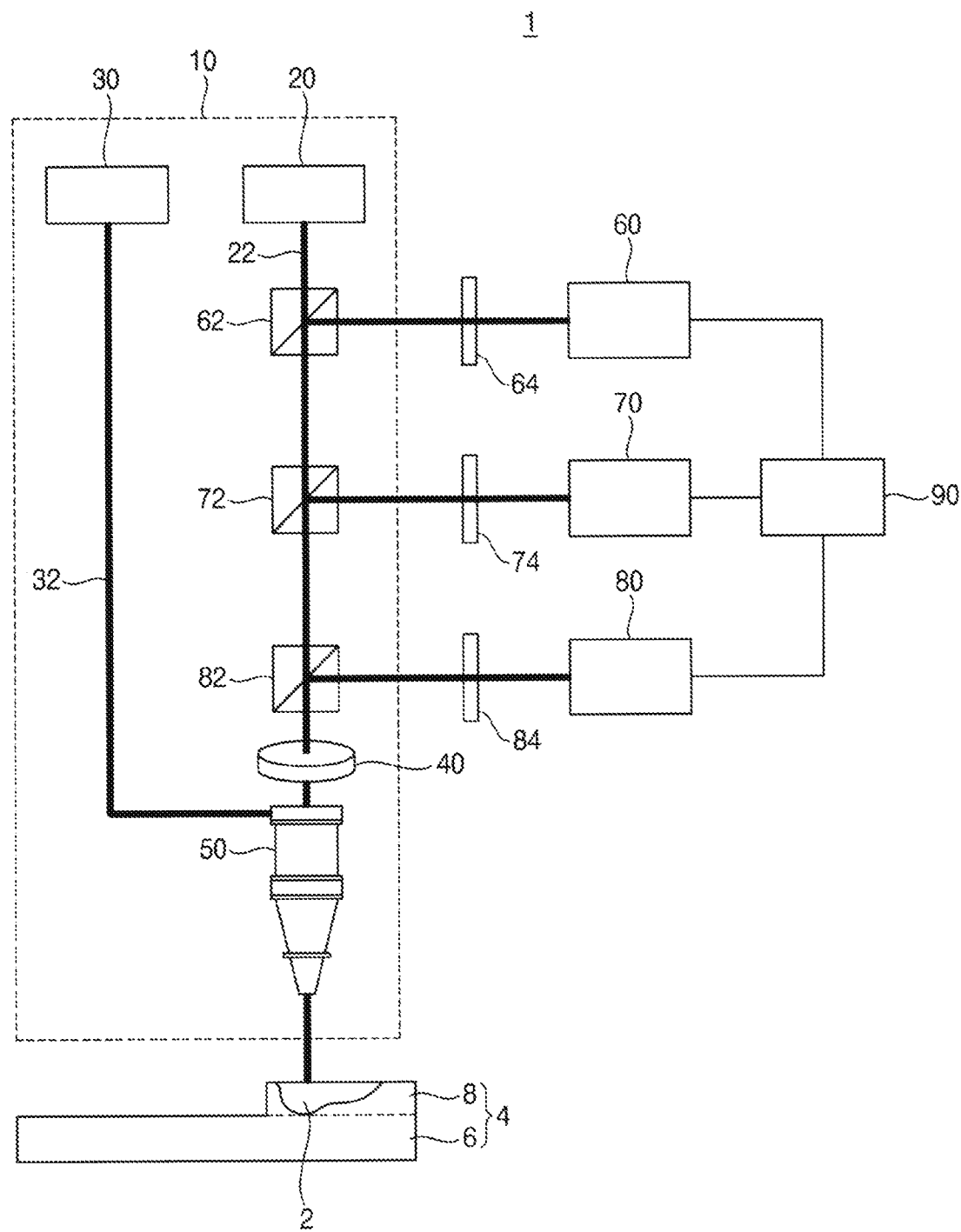
FIG. 1 is a block diagram of a 3D printing system according to an embodiment of the present disclosure.

Hereinafter, embodiments of the present disclosure will be described in detail with reference to the accompanying drawings. The present disclosure may be implemented in various different forms, and is not limited to the embodiments described herein. In the drawings, parts irrelevant to the description are omitted in order to clearly describe the present disclosure, and the same reference numerals are assigned to the same or similar elements throughout the specification.

The 3D printing system according to an embodiment of the present disclosure is a system capable of melting a base material using a laser to form a three-dimensional object, and also capable of real-time feedback process control by performing on-line nondestructive evaluation (NDE) during the 3D printing process. In this case, the 3D printing system according to an embodiment of the present disclosure may be a DED type 3D printing system capable of forming a 3D object by melting metal powder or metal wire with a laser.

FIG. 1 illustrates a configuration of a 3D printing system according to an embodiment of the present disclosure.

Referring to FIG. 1, in an example embodiment the 3D printing system 1 may include a laser source 20 for 3D printing, a base material supply source 30, a focus lens 40, a nozzle 50, a thermal imaging camera 60 such as an infra-red camera, a vision camera 70, a laser ultrasonic device 80, and a control unit 90.

Here, the laser source 20, the base material supply source 30, the focus lens 40, and the nozzle 50 may constitute a general DED type 3D printer 10. However, the 3D printer 10 applicable to the 3D printing system 1 according to an embodiment of the present disclosure is not limited to the DED method. A 3D printer capable of forming a molten pool of metal may applicable to the 3D printing system 1 according to the present disclosure.

In an example embodiment, the 3D printing system 1 may include the thermal imaging camera 60, the vision camera 70, and the laser ultrasonic device 80 which are coaxially provided with the DED type 3D printer 10. In other words, the thermal imaging camera 60, the vision camera 70, and the laser ultrasonic device 80 may be disposed coaxially with the laser source 20. Here, the coaxial disposition means that related components are arranged so that a plurality of laser beams share the same optical path, and a beam splitter, a dichroic mirror, a filter, etc. make the laser beams be separated and/or transmit so that the laser beams share the optical path.

Accordingly, it is possible to continuously photograph and inspect the 3D printing object 4 without controlling positions of the thermal imaging camera 60, the vision camera 70, and the laser ultrasonic device 80.

In an example embodiment, the thermal imaging camera 60, the vision camera 70, the laser ultrasonic device 80, and the control unit 90 may form a thermal image and laser ultrasound integrated inspection system 100 for 3D printing process. Accordingly, the 3D printing system 1 includes the 3D printer 10 and the thermal image and laser ultrasound integrated inspection system 100 for the 3D printing process.

Referring to FIG. 1, in an example embodiment, the laser source 20 may irradiate a laser beam 22 to a 3D printing object 4. The laser beam 22 irradiated from the laser source 20 passes through the focus lens 40 and is incident on the 3D printing object 4. The laser beam 22 irradiated from the laser source 20 may pass through the nozzle 50 for supplying the base material while the laser beam 22 reaches a molten pool 2. Here, the laser source 20 may have a wavelength band of 1.07 µm or less.

In an example embodiment, the base material supplied from the base material supply source 30 may be fed to the nozzle 50 in the form of, for example, metal powder or metal wire through a separate supply pipe 32. To supply the base material to the 3D printing object 4, the movement path of the base material in the nozzle 50 may be formed to be parallel to or oblique to the path through which the laser beam 22 passes. The base material supplied to the 3D printing object 4 may be melted by the laser source 20 to form the molten pool 2 in the 3D printing object 4.

The 3D printing object 4 may be formed as a three-dimensional object by laminating a plurality of layers. In FIG. 1, illustrated is an example state where the 3D printing object 4 is formed of, for example, a first layer 6 and a second layer 8, and the molten pool 2 is formed on the second layer 8.

The thermal imaging camera 60 may acquire a thermal image of the molten pool 2 formed in the 3D printing object 4. Here, the thermal imaging camera 60 may have a wavelength band different from that of the laser source 20. As an example, the thermal imaging camera 60 may have a wavelength band of 2-5 µm.

In order to configure the thermal imaging camera 60 in a coaxial arrangement with the laser source 20, a first beam splitter 62 may be disposed on the path of the laser beam 22 irradiated from the laser source 20. The first beam splitter 62 may separate a part of the laser beam 22 reflected from the 3D printing object 4 toward the thermal imaging camera 60.

In addition, a first filter unit 64 may be disposed between the first beam splitter 62 and the thermal imaging camera 60. In this case, the first filter unit 64 may allow the wavelength band of the thermal imaging camera 60 to pass through itself. Accordingly, the thermal imaging camera 60 can obtain a thermal image by extracting only the laser beam of its own wavelength band from the laser beam 22.

The vision camera 70 may acquire a real image of the 3D printing object 4. Here, the vision camera 70 may have a wavelength band different from that of the laser source 20. As an example, the vision camera 70 may have a wavelength band of 600 nm to 900 nm.

In an example embodiment, in order to configure the vision camera 70 in a coaxial arrangement with the laser source 20, a third beam splitter 82 may be disposed on the path of the laser beam 22 irradiated from the laser source 20. The third beam splitter 72 may separate a part of the laser beam 22 reflected from the 3D printing object 4 toward the vision camera 70.

In an example embodiment, a third filter unit 74 may be disposed between the third beam splitter 72 and the vision camera 70. In this case, the third filter unit 74 may allow the wavelength band of the vision camera 70 to pass through itself. Accordingly, the vision camera 70 may extract only the laser beam of its own wavelength band from the laser beam 22 to obtain an image of the 3D printing object 4 in a state of processing.

The laser ultrasonic device 80 may receive laser ultrasound waves reflected from the 3D printing object 4. Here, the laser ultrasonic device 80 may have a wavelength band different from that of the laser source 20. As an example, the laser ultrasonic device 80 may have a wavelength band of 515 nm or less. In addition, the laser ultrasonic device 80 may be a femtosecond laser device.

In an example embodiment, a second beam splitter 82 may be disposed on the path of the laser beam 22 irradiated from the laser source 20 to configure the laser ultrasonic device 80 in a coaxial arrangement with the laser source 20. The second beam splitter 82 may separate a part of the laser beam 22 reflected from the 3D printing object 4 toward the laser ultrasonic device 80.

In an example embodiment, a second filter unit 84 may be disposed between the second beam splitter 82 and the laser ultrasonic device 80. In this case, the second filter unit 84 may allow the wavelength band of the ultrasonic laser device 80 to pass through itself. Thereby, the laser ultrasonic device 80 can selectively receive only laser ultrasound of its own wavelength band from the laser beam 22.

Here, for the coaxial arrangement of the thermal imaging camera 60, the vision camera 70, and the laser ultrasonic device 80, it is illustrated and described as having only the beam splitters and filter units, but it may include an optical path converter such as a mirror having a constant reflection angle, or a dichroic mirror that passes or reflects a specific wavelength band.

In FIG. 1, the thermal imaging camera 60, the vision camera 70, and the laser ultrasonic device 80 are illustrated to be disposed on one side of the laser beam 22, but are not limited thereto. For example, the thermal imaging camera 60, the vision camera 70, and the laser ultrasonic device 80 may be disposed on both sides of the laser beam 22 according to the deformation of the beam splitter.

In an example embodiment, the control unit 90 may perform the 3D printing quality inspection of the 3D printing object 4 on the basis of the measurement signals including at least one of a thermal image acquired by the thermal imaging camera 60, a response of the laser ultrasound wave received by the laser ultrasonic device 80, a vision image acquired by the vision camera 70, and sound.

In an example embodiment, as will be described later, the control unit 90 may calculate a laser ultrasonic response using a pulse-echo technique or a pitch-catch technique.

Hereinafter, a 3D printing quality inspection based on analysis of measurement signals such as thermal image and laser ultrasonic response will be described with reference to FIGS. 2 to 4. Here, the 3D printing quality means the laminated printing state of the 3D printing object. The 3D printing quality may include at least one of physical property, defect, and shape of the 3D printing object, as an index indicating the 3D printing quality. Specifically, the physical property may include rigidity and elastic modulus of the 3D printing object, and the defect may include internal void and surface crack of the 3D printing object. In addition, the shape may include length, thickness, width, depth, and size of the 3D printing object.

Figure 2:
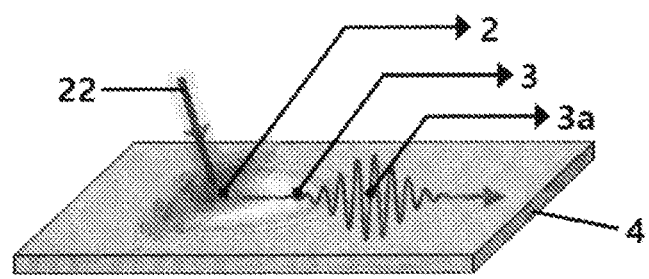
FIG. 2 is a diagram schematically illustrating the generation of a molten pool, a thermal wave, and a laser ultrasound wave in a 3D printing object by a laser source in the 3D printing system according to an embodiment of the present disclosure.

FIG. 2 schematically illustrates a molten pool, a thermal wave, and a laser ultrasound wave generated in a 3D printing object by a laser source of the 3D printing system according to an embodiment of the present disclosure.

Referring to FIG. 2, the laser beam 22 irradiated from the laser source 20 may be irradiated onto the 3D printing object 4 to form a molten pool 2.

In an example embodiment, the thermal wave 3 may be generated by the thermal energy of the laser beam 22 or the heat of the melting pool 2. The generated thermal wave 3 may propagate along the 3D printing object 4. Here, the thermal wave 3 may be related to the thermal energy distribution, the thermal energy transmission rate, or the heat diffusion rate of the 3D printing object 4. That is, the thermal energy distribution, the thermal energy transmission rate, or the heat diffusion rate may be affected by the 3D printing quality of the 3D printing object 4.

In addition, as the laser beam 22 is reflected from the 3D printing object 4, a laser ultrasound wave 3a may be generated. That is, the laser beam 22 traveling in the thickness direction of the 3D printing object 4 may be reflected from its surface (upper or lower) and emitted back to the outside of the 3D printing object 4. The reflected wave may be a laser ultrasound wave 3a.

The laser ultrasound wave 3a may be related to the arrival time or wave velocity as a response to the 3D printing object 4. That is, the arrival time and wave velocity of the laser ultrasound wave 3a may be affected by the printing quality of the 3D printing object 4. Here, the arrival time refers to a time taken from the time of irradiation of the laser beam 22 to the time of reception of the laser ultrasound wave 3a by reflection.

As described above, the thermal image and the response of the laser ultrasound wave 3a may interact according to the printing state of the 3D printing object 4 to exhibit the 3D printing quality. In other words, the thermal image and the response of the laser ultrasound wave 3a may be varied according to the printing quality of the 3D printing object 4.

Therefore, in an example embodiment, it is possible to estimate the printing quality of the 3D printing object 4 by analyzing a thermal image of the 3D printing object 4 and a measurement signal such as the laser ultrasound wave 3a.

Figure 3:
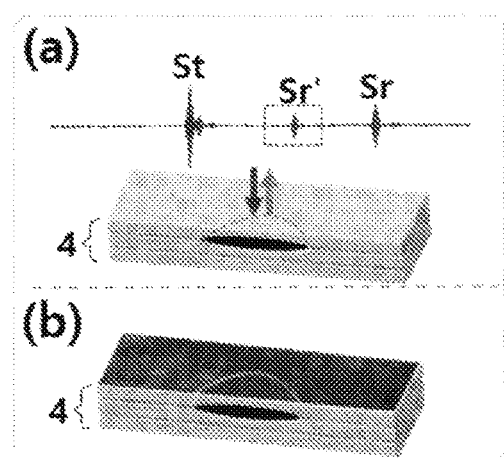
FIG. 3 is a diagram illustrating an example of data fusion-based defect detection from a laser ultrasound wave and a thermal image using a pulse-echo technique in the 3D printing system according to an embodiment of the present disclosure.

FIG. 3 illustrates an example of defect detection based on a laser ultrasound wave and a thermal image by a pulse-echo method in the 3D printing system according to an embodiment of the present disclosure.

When there is no defect in the 3D printing object 4, the laser beam 22 irradiated to the 3D printing object 4 may generate a reflected wave St reflected by the top surface of the 3D printing object 4 and a reflected wave Sr reflected by the bottom surface of the 3D printing object 4. Here, the response of the laser ultrasound wave 3a may be obtained using the pulse-echo method, and an irradiation position of the laser beam 22 and a reception position of the laser ultrasound wave 3a may be the same.

However, when a defect such as a void exists in the 3D printing object 4, the laser beam 22 irradiated to the 3D printing object 4 may generate an additional reflected wave Sr' caused by the void as shown in (a) of FIG. 3. That is, it may be determined whether or not the 3D printing object 4 is defective according to whether the additional reflected wave Sr' is generated or not. In other words, when the additional reflected wave Sr' is detected in addition to the normal reflected waves St and Sr, it may be estimated that a void exists in the 3D printing object 4.

On the other hand, the thickness of the 3D printing object 4 may be determined based on the reflected waves St and Sr.

In this case, it may not be clear whether the additional reflected wave Sr' is due to a defect or a thickness change of the 3D printing object 4. To compensate for this, it is possible to determine whether there is a defect by combining the data of the thermal image thereto.

In more detail, as shown in (b) of FIG. 3, when the defect such as the void exist in the 3D printing object 4, the history of thermal energy of the 3D printing object 4 may be changed. That is, the distribution of thermal energy of the 3D printing object 4 may be changed. In this way, it is possible to determine whether the 3D printing object 4 is defective according to whether the thermal energy distribution of the 3D printing object 4 changes or not based on the thermal image. In other words, if the thermal energy distribution in the thermal image of the 3D printing object 4 changes, it can be estimated that a defect in the 3D printing object 4 exists.

In an example embodiment, the control unit 90 may detect the presence of any defect in the 3D printing object 4 based on the additional reflected wave Sr' of the response of the laser ultrasound wave and change in the thermal energy distribution of the thermal image. As a result, compared to the case of monitoring only the response of the laser ultrasound or the change in the thermal energy distribution of the thermal image, the present disclosure can more accurately detect whether or not the 3D printing object 4 is defective.

Figure 4:
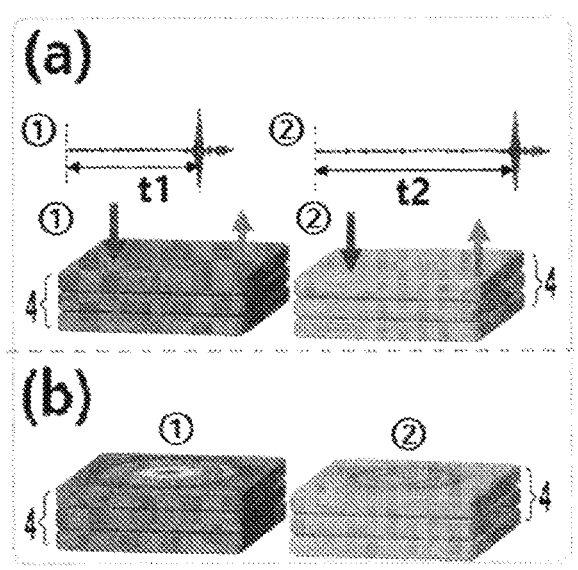
FIG. 4 is a diagram illustrating an example of data fusion-based physical property estimation from a laser ultrasound wave and a thermal image using a pitch-catch technique in the 3D printing system according to an embodiment of the present disclosure.

FIG. 4 illustrates an example of estimating physical properties based on the laser ultrasound wave and the thermal image using a pitch-catch method in the 3D printing system according to an embodiment of the present disclosure.

As shown in (a) of FIG. 4, the arrival time of the laser ultrasound wave 3a may vary according to physical properties such as rigidity, elastic modulus, etc. of the 3D printing object 4. Here, the response of the laser ultrasound wave 3a may be obtained using the pitch-catch method, and the irradiation position of the laser beam 22 and the receiving position of the laser ultrasound wave 3a are different.

With reference to (a) of FIG. 4, when the 3D printing object 4 is stiff, the arrival time (t1) of the laser ultrasound wave 3a is relatively short as shown in ①. Further, when the 3D printing object 4 is soft, the arrival time (t2) of the laser ultrasound wave 3a is relatively long. That is, according to the arrival time of the laser ultrasound wave 3a, it is possible to estimate the physical property such as rigidity of the 3D printing object 4.

Meanwhile, since the arrival time of the laser ultrasound wave 3a is measured by a reflected wave by the 3D printing object 4, it may depend on a change in the thickness of the 3D printing object 4. That is, the physical properties of the 3D printing object 4 may not be clearly estimated only by the arrival time of the laser ultrasound wave 3a. To compensate for this, it is possible to determine whether there is a defect by using the data of the thermal image in combination with the data of arrival time.

As shown in (b) of FIG. 4, heat propagation characteristics may vary according to the physical property of the 3D printing object 4. That is, the thermal energy transmission rate of the 3D printing object 4 may vary. Here, the thermal energy transmission rate may depend on the heat diffusion rate of the 3D printing object 4. In this way, it is possible to estimate physical property such as rigidity of the 3D printing object 4 according to the thermal energy transmission rate of the 3D printing object 4.

In this case, the control unit 90 may estimate the rigidity of the 3D printing object 4 according to the arrival time and wave velocity of the response of the laser ultrasound wave 3*a* and the thermal energy transmission rate in the thermal image. Using several data for the estimation like this can provide more accurate estimation of the physical properties of the 3D printing object 4, compared to the case of monitoring only either the response of the laser ultrasound waves or the change in the thermal energy transmission rate in the thermal image.

In an example embodiment, the 3D printing system 1 may perform feedback process control in real time during the 3D printing process in order to improve the 3D printing quality when abnormal quality is detected based on the result of the 3D printing quality inspection using the control unit 90.

Hereinafter, a real-time feedback control method of the 3D printing process using the control unit 90 will be described with different drawings.

Figure 5:
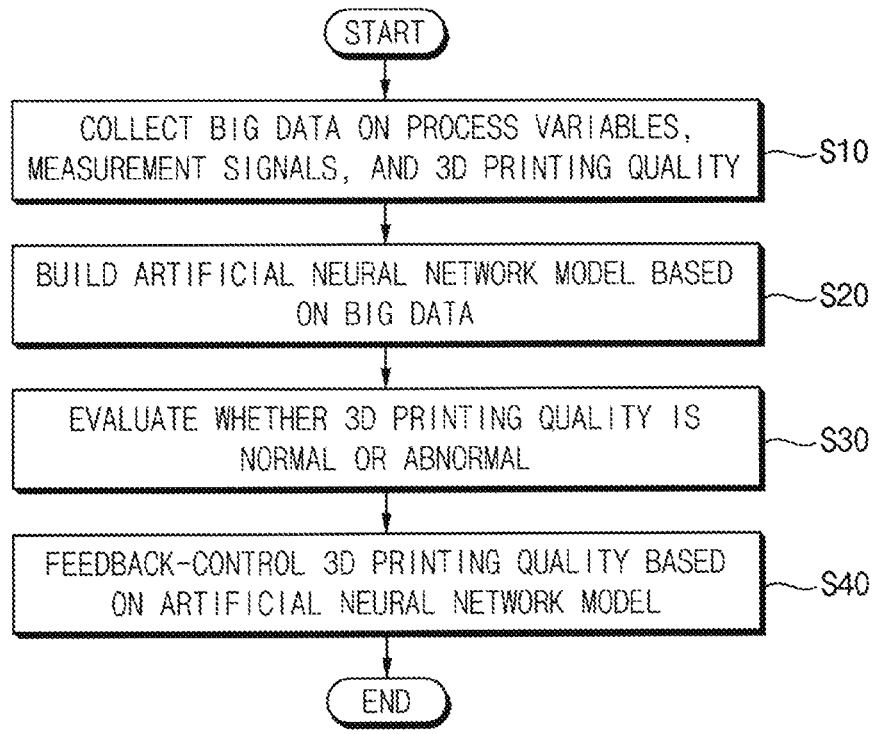
FIG. 5 is a flowchart of a real-time feedback control method of a 3D printing process with the 3D printing system according to an embodiment of the present disclosure.
Figure 12:
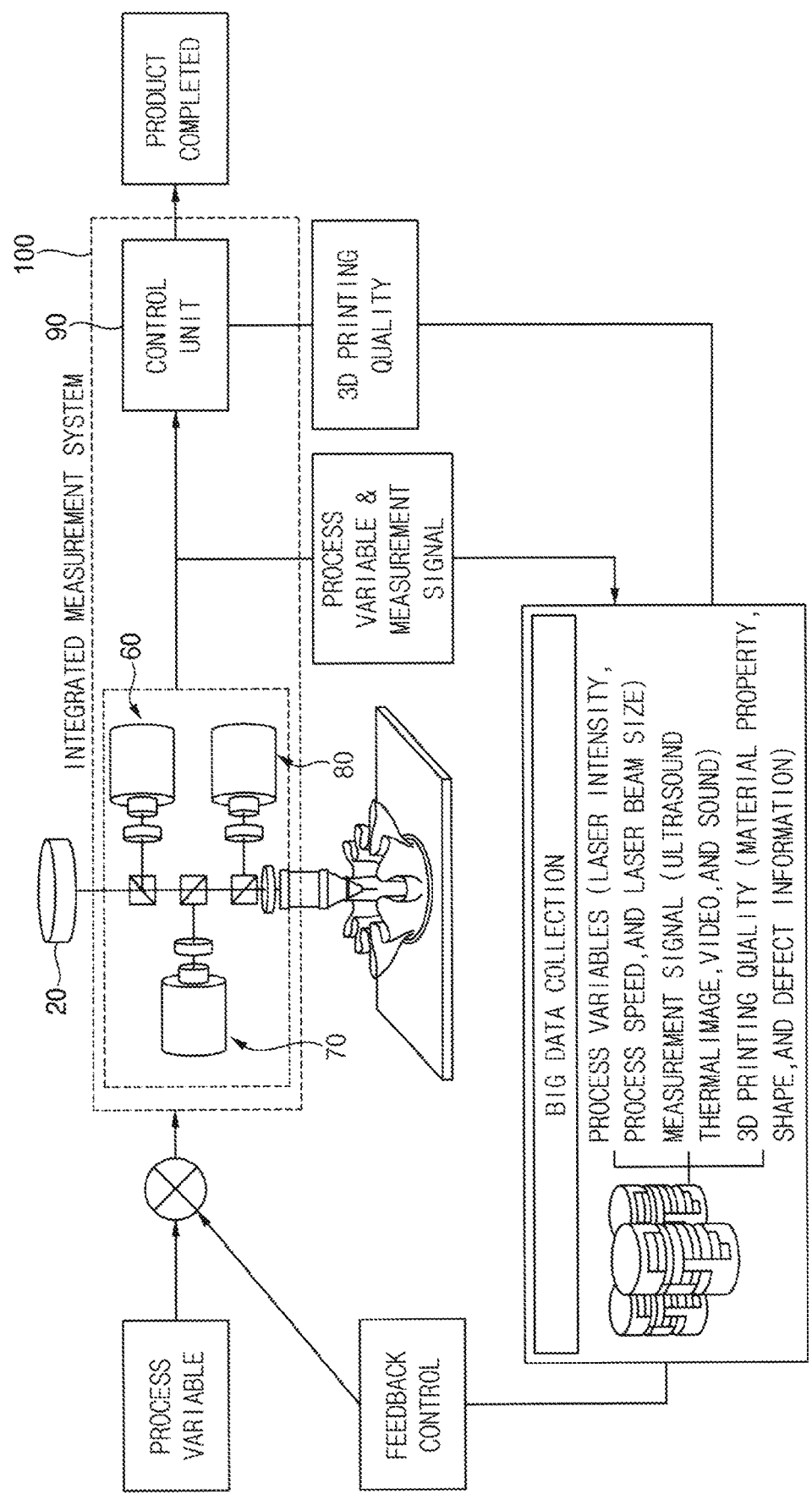
FIG. 12 is a schematic block diagram illustrating real-time feedback process control and big data collection in the 3D printing system according to an embodiment of the present disclosure.

FIG. 5 is a flowchart of a real-time feedback process control method during the 3D printing process in the 3D printing system according to an embodiment of the present disclosure. FIG. 12 is a block diagram illustrating real-time feedback process control and big data collection in the 3D printing system 1 according to an example embodiment.

With reference to FIGS. 5 and 12, the real-time feedback control method of the 3D printing process may include the steps of: collecting big data related to 3D printing process variables, measurement signals for measuring the state of the 3D printing process, and the 3D printing quality (S10); building an artificial neural network model based on the big data (S20); evaluating whether or not a quality of the 3D printing is abnormal in real time (S30); and feedback controlling the 3D printing quality based on the artificial neural network model (S40).

Figure 6:
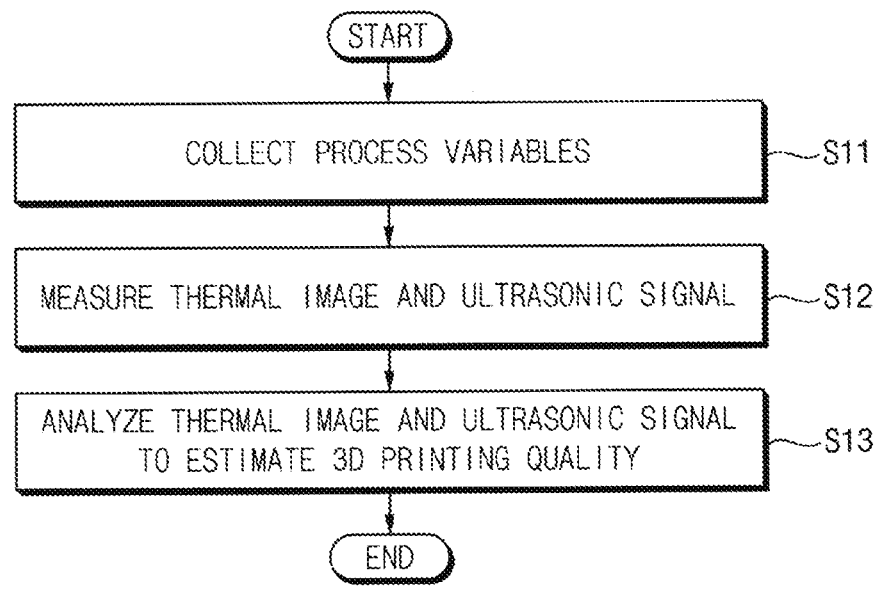
FIG. 6 is a flow chart showing a detailed procedure of collecting big data in the real-time feedback process control method with the 3D printing system according to an embodiment of the present disclosure.

FIG. 6 is a flow chart showing a detailed procedure of collecting the big data in the real-time feedback process control method in the 3D printing system according to an embodiment of the present disclosure.

With reference to FIG. 6, the step (S10) of collecting the big data may include collecting the process variables (S11), measuring a thermal image and an ultrasonic signal (S12), and analyzing the thermal image and ultrasonic signal to estimate the 3D printing quality (S13).

In an example embodiment of the present disclosure, in the step S11 of collecting the process variables, that is, process inputs which are variables that can be actively adjusted in the 3D printing process, may be collected. In an example, the process variables may include at least one of the intensity of the laser beam, the process speed, the size of the laser beam, and the discharge amount of the base powder. However, process variables applied to the 3D printing are not limited thereto.

In an example embodiment, the 3D printing system 1 may measure a thermal image and an ultrasonic signal of the 3D printing object 4 (S12).

In addition, the control unit 90 may estimate the 3D printing quality by analyzing the measured thermal image and the ultrasonic signal (S13). For example, by analyzing the ultrasonic signal, the elastic modulus of the 3D printing object 4 may be estimated, or the depth of the molten pool 2 may be estimated from the surface temperature of the molten pool 4 measured by the thermal imaging camera 60.

Figure 7:
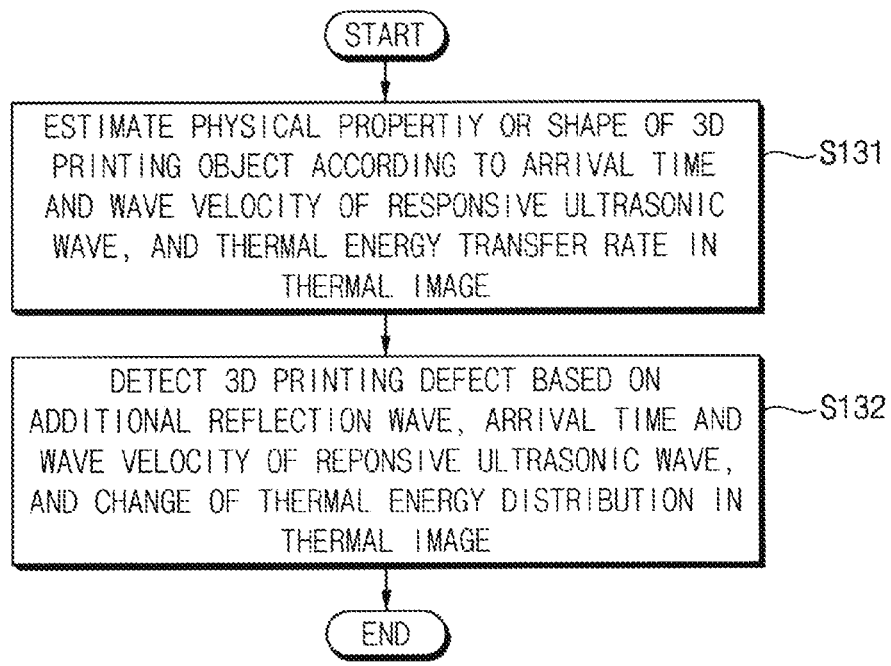
FIG. 7 is a flowchart illustrating a detailed procedure of estimating a 3D printing quality by analyzing an ultrasonic signal in the real-time feedback process control method with the 3D printing system according to an embodiment of the present disclosure.

FIG. 7 is a flow chart showing a detailed procedure of estimating the 3D printing quality by analyzing an ultrasonic signal in the real-time feedback process control method with the 3D printing system according to an embodiment of the present disclosure.

Referring to FIG. 7, in the step S13 of estimating the 3D printing quality by analyzing a thermal image and an ultrasonic signal, the physical property and/or shape of the 3D printing object 4 may be estimated based on at least one of the arrival time and wave velocity of the response of the ultrasound wave affected by the physical property and shape of the 3D printing object 4 and the thermal energy transmission rate in the thermal image as described above (S131).

Further, in the step of estimating the 3D printing quality by analyzing the thermal image and the ultrasonic signal (S13), the presence of a defect may be detected based on the additional reflected wave of the response of the ultrasonic wave, the arrival time and the wave velocity, which are affected by the defect of the 3D printing object, and change in the thermal energy distribution in the thermal (S132).

In an example embodiment, the control unit 90 may collect data of the process variables, measurement signals for measuring the state of the 3D printing process, and data related to the 3D printing quality estimated from the measurement signals. All these data may be collected to be used as big data when constructing an artificial neural network model to be described later. In this case, the big data may be collected through lots of repetitive experiments of the 3D printing before the actual 3D printing process.

Figure 8:
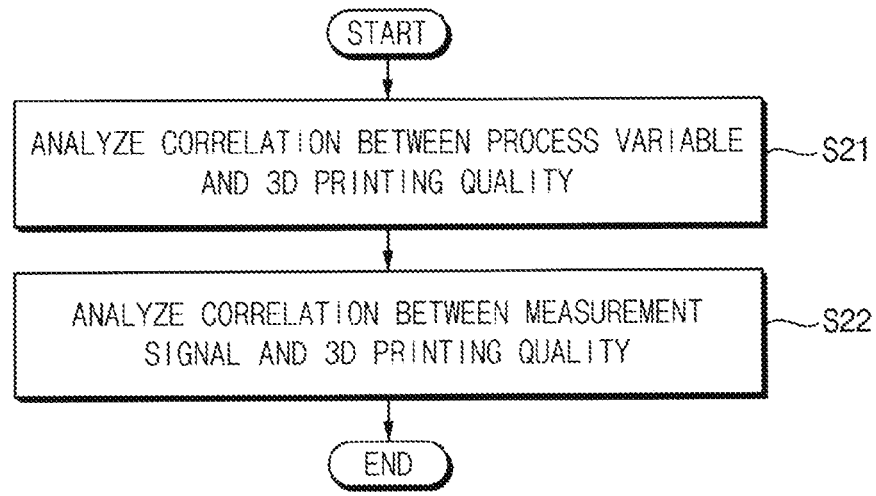
FIG. 8 is a flow chart showing a detailed procedure of constructing an artificial neural network model in the real-time feedback process control method with the 3D printing system according to an embodiment of the present disclosure.
Figure 13:
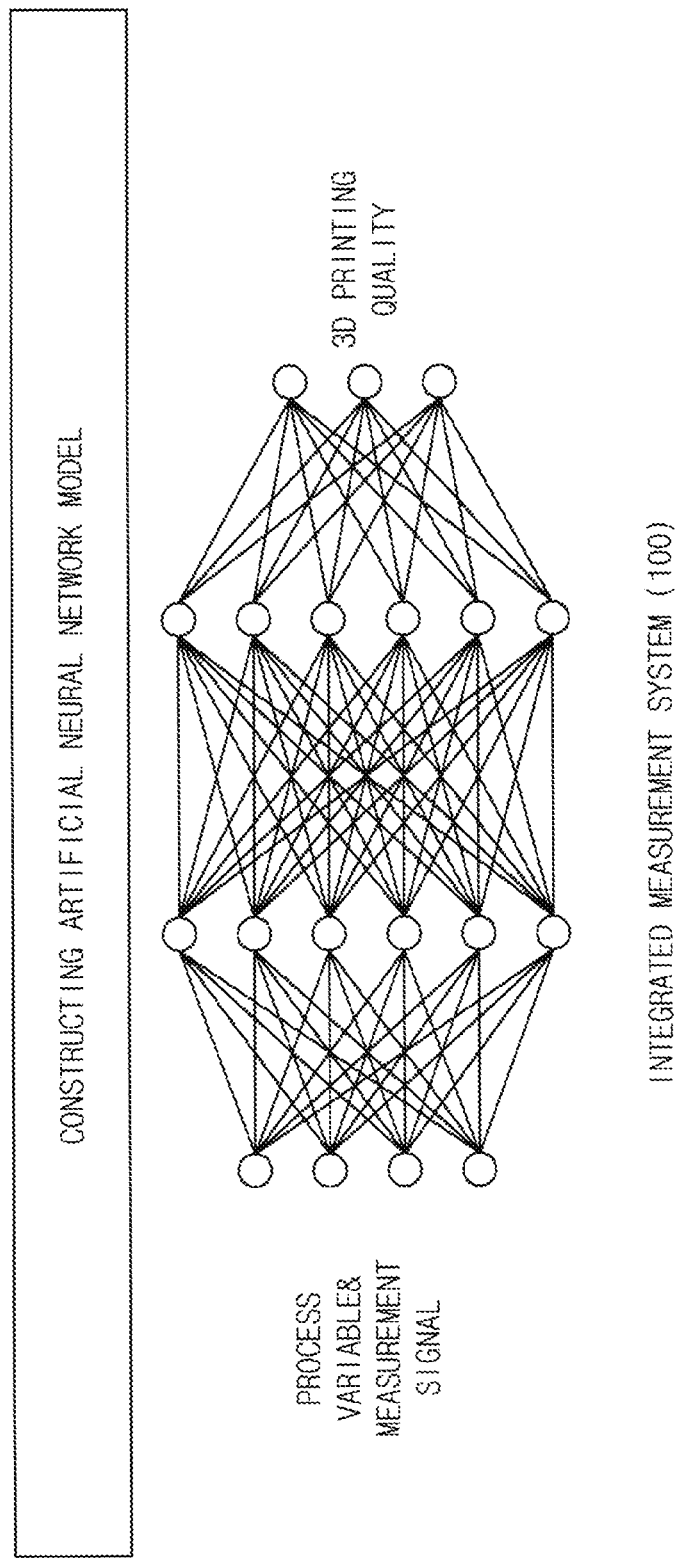
FIG. 13 is a schematic diagram illustrating analyzing a correlation between the process variables and/or the measurement signal and the 3D printing quality based on the artificial neural network model built by using machine-learning.

FIG. 8 is a flow chart showing a detailed procedure of the step of building the artificial neural network model in the real-time feedback process control method with the 3D printing system according to an embodiment of the present disclosure. FIG. 13 is a schematic diagram illustrating analyzing a correlation between the process variables and/or the measurement signal and the 3D printing quality based on the artificial neural network model built by using machine-learning.

Referring to FIGS. 8 and 13, the control unit 90 may analyze a correlation between the big data and build the artificial neural network model based on the collected big data to predict an expected 3D printing quality (S20).

In an example embodiment, the control unit 90 may use machine-learning to analyze the correlation between 3D printing process variables and measurement signals and 3D printing quality. The machine-learning is known as a technology that studies and builds a system that improves its own performance by learning and predicting based on empirical data and algorithms for it. The control unit 90 of the 3D printing system 1 may use a known algorithm or program in connection with the machine-learning algorithm that performs the machine-learning.

In an example embodiment, the control unit 90 of the 3D printing system 1 may be configured to construct a specific artificial neural network model to predict or estimate the 3D printing quality including at least one of the shape of the molten pool 2, physical properties and defects of the 3D printing object 4 (S21). For the prediction or estimation, the control unit 90 may use a machine-learning algorithm and provide the data of process variables for 3D printing as input data.

In this case, the control unit 90 may be configured to repeatedly learn the 3D printing quality data under the above-described process variables and analyze a correlation between the process variables and the 3D printing qualities based on the accumulated data to form an artificial neural network model. By deriving values of the process variables for improving the 3D printing quality based on the correlation using the artificial neural network model, the feedback control for the 3D printing process, which will be described later, becomes possible.

In an example embodiment, the control unit 90 may be configured to construct a specific artificial neural network model to predict and estimate the 3D printing quality by using measurement signals including thermal images and ultrasonic signals as input data (S22).

In this case, the control unit 90 may be configured to repeatedly learn the 3D printing quality data estimated from specific measurement signals and analyze the correlation between the measurement signals and the 3D printing qualities based on the accumulated data to form the artificial neural network model. Using the artificial neural network model has the advantage of being able to quickly predict a 3D printing quality using only the measurement signal itself, even without going through the process of analyzing the measurement signal.

After constructing the artificial neural network model in the control unit 90 through such repetitive learning, step S30 of evaluating whether or not the printing quality of the 3D printing is abnormal in real time may be performed.

In step S30, the 3D printing quality may be monitored, and whether or not there is a quality abnormality may be determined according to the monitoring result. In particular, it should be noted that monitoring the 3D printing quality and determining the quality abnormality may be performed according to various criteria or methods, and are not limited to only the three criteria or methods described later in this specification.

Figure 9:
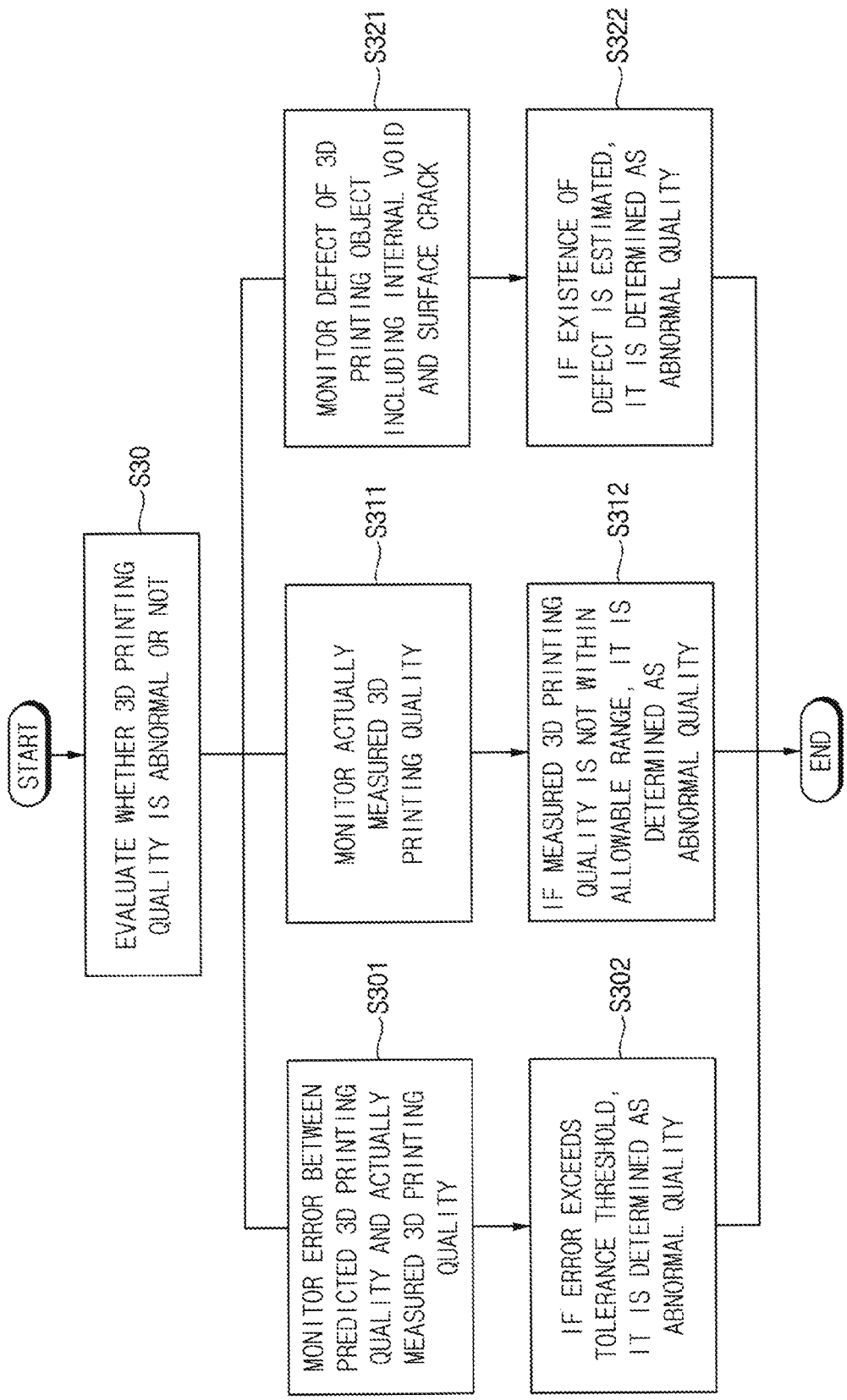
FIG. 9 is a flowchart illustrating a detailed procedure of evaluating whether or not there is an abnormality in 3D printing quality in the real-time feedback process control method with the 3D printing system according to an embodiment of the present disclosure.

FIG. 9 is a flow chart showing a detailed procedure of evaluating whether or not the 3D printing quality is abnormal in the real-time feedback process control method using the 3D printing system according to an embodiment of the present disclosure.

Referring to FIG. 9, in the step S30 according to an example embodiment, an error between a predicted value of the 3D printing quality and a measured value of the 3D printing quality is monitored (S301). If the error exceeds a tolerance threshold, it may be determined that the quality is abnormal (S302).

Figure 10:
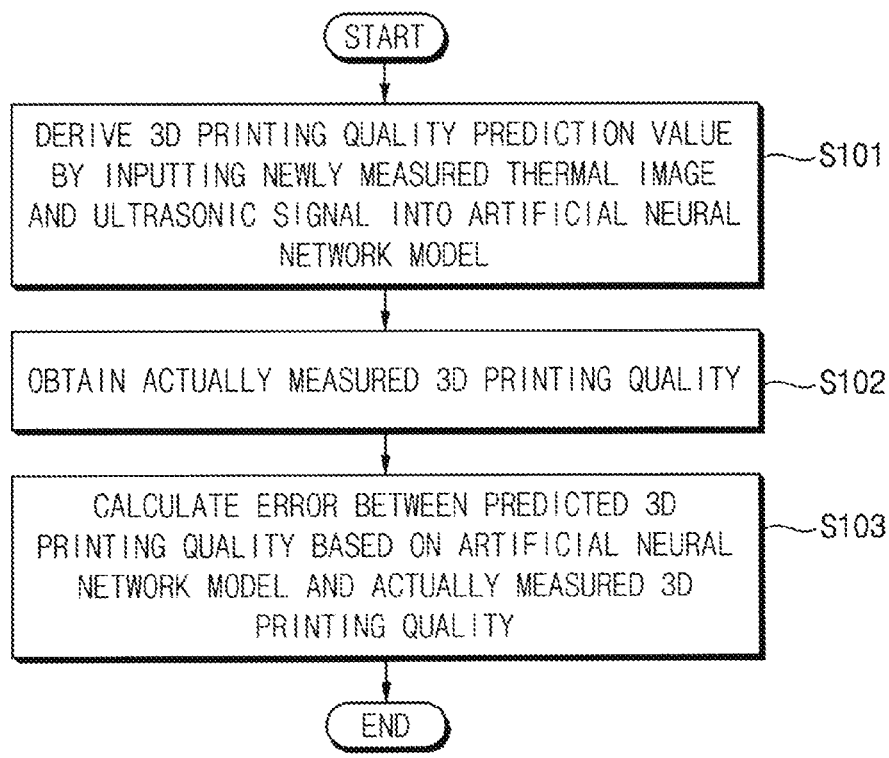
FIG. 10 is a flow chart showing a detailed procedure of monitoring an error between a predicted value and a measured value of 3D printing quality in the real-time feedback process control method with the 3D printing system according to an embodiment of the present disclosure.
Figure 14:
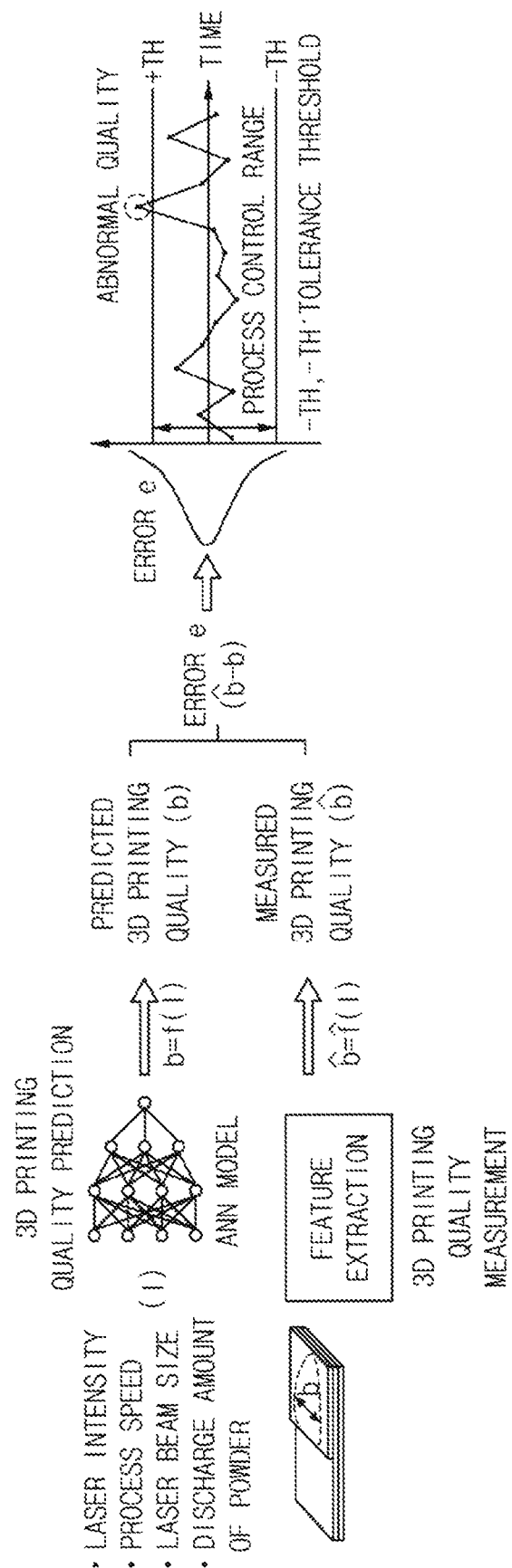
FIG. 14 shows a process of monitoring whether or not the 3D printing quality is abnormal in real time.

FIG. 10 is a flow chart showing a detailed procedure of monitoring the error between the predicted value of the 3D printing quality and the measured value of the 3D printing quality in the real-time feedback process control method with 3D printing system according to an embodiment of the present disclosure. FIG. 14 conceptually shows a process of monitoring whether or not the 3D printing quality is abnormal in real time.

Referring to FIGS. 10 and 14, to monitor the error (S301) by comparing the predicted value of the 3D printing quality and the measured value of the 3D printing quality, first a predicted value of the 3D printing quality may be derived from a newly measured thermal image and an ultrasonic signal using the artificial neural network model (S101). That is, the newly measured thermal image and ultrasonic signal may be input to the artificial neural network model to obtain a predicted value of the 3D printing quality. In addition, a measured value of the 3D printing quality can be obtained by analyzing an actually measured signal (S102). An error between the 3D printing quality value predicted by the artificial neural network model and the actually measured 3D printing quality value may be calculated (S103). Here, the actually measured 3D printing quality value may be specified by the 3D printing quality derived by analyzing the measurement signals such as the thermal image of the 3D printing object and ultrasonic signals obtained during the 3D printing process through the above-described method.

In this case, the error between the predicted 3D printing quality value and the actually measure 3D printing quality value may be used as a criterion for determining an abnormality in the printing quality of the 3D printing object.

That is, in an example embodiment, the control unit 90 may preset a tolerance threshold for an error between a predicted value of the 3D printing quality value through the artificial neural network model and an actually measured value of the 3D printing quality value. When an error exists within a tolerance threshold range, it is determined that a predetermined quality criterion is satisfied, and a 3D printing process may continue.

If the error is out of the tolerance threshold range, it may be determined as abnormal quality (S302). As a result, real-time feedback process control, which will be described later, may be performed to adjust process variables (S40).

Secondly, referring again to FIG. 9, in step S30 to evaluate whether or not the 3D printing quality of 3D printing is abnormal in real time, the measured value of the 3D printing quality may be monitored (S311). If the measured value is not a value within the tolerance threshold range, it may be determined that the quality is abnormal (S312).

In an example embodiment, a range of allowable measurement values for the elastic modulus among physical properties may be preset and it may be monitored whether measured values of the elastic modulus among physical properties fall within the preset allowable range (S311). If the measured values are not within the allowable range, it may be determined as abnormal quality (S312). Here, the measured values may be the 3D printing quality derived by analyzing measurement signals such as thermal images and ultrasonic signals acquired during the 3D printing process.

Thirdly, referring to FIG. 9, in step S30 to evaluate whether or not the 3D printing quality of 3D printing is abnormal in real time, it may be monitored whether there exists any defect, including at least any one of an internal void and a surface crack, in the 3D printing object 4 by analyzing the thermal image and the ultrasonic signals for the 3D printing object 4 (S321). If it is estimated that the defect exists in the 3D printing object 4, it may be determined as abnormal quality (S322).

In an example embodiment, when an additional reflection waves Sr' or nonlinearity of the ultrasonic signal is detected from the received ultrasonic signal, it may be estimated that there is at least any one of the internal void or the surface crack in the 3D printing object 4 (S321), which this may be determined as the abnormal quality (S322).

In an example embodiment, the step S30 of evaluating whether or not the printing quality of 3D printing is abnormal in real time may include all three printing quality monitoring methods (S301, S311, and S321) mentioned above, or only a part of them. In addition, the printing quality monitoring method is not limited to the three methods mentioned above and may include any other monitoring method not discussed herein.

In an example embodiment, the 3D printing system 1 may perform feedback control for the 3D printing process in real time based on the artificial neural network model according to the printing quality evaluation result in step S30 (S40).

Figure 11:
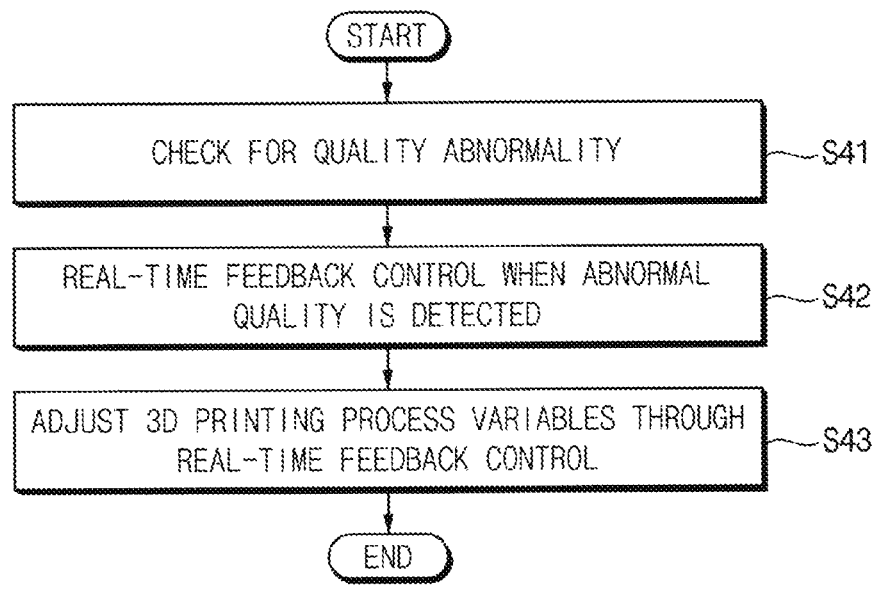
FIG. 11 is a flow chart showing a detailed procedure of the feedback control of the 3D printing quality in the real-time feedback process control method of the 3D printing system according to an embodiment of the present disclosure.
Figure 15:
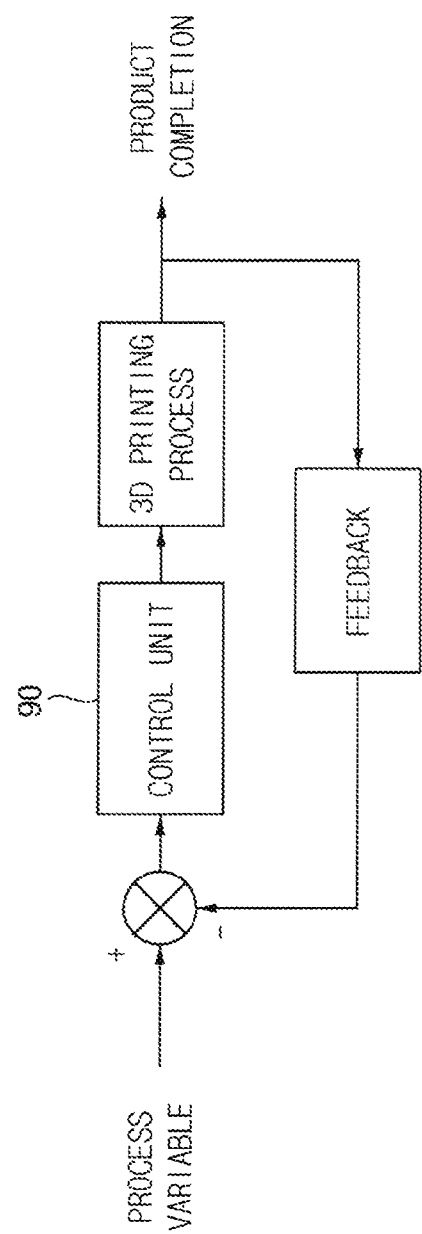
FIG. 15 is a block diagram illustrating a process of feedback controlling the process variables when quality abnormality in the 3D printing is detected.

FIG. 11 is a flowchart illustrating a detailed procedure of the step of feedback controlling the 3D printing quality according to an example embodiment. FIG. 15 is a block diagram illustrating a process of feedback controlling the process variables when abnormal quality is detected in the 3D printing.

Referring to FIGS. 11 and 15, inspection on whether or not the 3D printing quality is abnormal may be performed (S41). When the result of inspection says that the printing quality is not normal, a real-time feedback control may be carried out (S42). In the feedback control, values of the process variables may be adjusted in real time so that the error or measurement signal above-described falls within the allowable threshold range (S43).

In the feedback control, the process variables to be controlled may be automatically selected by the control unit 90 in consideration of the correlation, acquired by machine-learning in the artificial neural network, between the process variable and the 3D printing quality. The feedback control of the process variables may be repeatedly performed until the error comes not to exceed the tolerance threshold.

With such a configuration, the 3D printing system 1 equipped with the integrated thermal image and laser ultrasonic inspection system 100 can perform an on-line and non-destructive evaluation of the printing quality in real time during the 3D printing process. In addition, process control can be performed in real time while actively controlling process variables according to the correlation learned through the artificial neural network model. Accordingly, the 3D printing quality and process efficiency can be improved.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A method of feedback controlling a 3D printing process in real-time during the 3D printing process in which a base material supplied to a 3D printing object is melted by a laser source for 3D printing and printed to form a 3D object, comprising:
   collecting big data, generated through 3D printing experiments, related to process variables of 3D printing, measurement signals, and 3D printing quality of the 3D printing object;
   building an artificial neural network model by performing machine-learning based on the collected big data;
   evaluating whether or not a 3D printing quality of the 3D printing object is abnormal in real time based on an actual measurement signal of the 3D printing object and the artificial neural network model; and
   feedback controlling printing quality of the 3D printing object in real time based on the evaluation result of whether or not the 3D printing quality of the 3D printing object is abnormal,
   wherein the 'collecting the big data' includes collecting the process variables of 3D printing; measuring a thermal image and an ultrasonic signal for the 3D printing object; estimating 3D printing quality by analyzing the collected process variables and the measured thermal image and the ultrasonic signal; and collecting big data related to the estimated 3D printing quality in real time during the 3D printing process.

2. The method of claim 1, wherein the method is performed in a state in which a thermal imaging camera for taking a thermal image of the 3D printing object and a laser ultrasonic device for measuring the ultrasonic signal are disposed coaxially with the laser source for 3D printing.

3. The method of claim 1, wherein the 'estimating 3D printing quality' includes estimating a physical property or shape of the 3D printing object based on at least one of an arrival time and a wave velocity of a responsive ultrasonic wave, and a thermal energy transfer velocity in the thermal image.

4. The method of claim 1, wherein the 'estimating 3D printing quality' includes detecting presence of a defect in the 3D printing object based on at least one of an additional reflection wave, an arrival time, and a wave velocity of a responsive ultrasonic wave, and a change in thermal energy distribution in the thermal image.

5. The method of claim 1, wherein the artificial neural network model is built by machine-learning correlations between data of the process variables and data of the 3D printing quality, and configured to estimate a predicted value of the 3D printing quality when new data of the process variables are provided as input data.

6. The method of claim 1, wherein the artificial neural network model is built by machine-learning correlations between the measurement signals and data of the 3D printing quality, and configured to estimate a predicted value of the 3D printing quality when a new measurement signal is provided as input data.

7. The method of claim 1, wherein the 'evaluating whether or not a 3D printing quality of the 3D printing object is abnormal' includes: deriving a prediction value of the 3D printing quality by inputting a thermal image and an ultrasonic signal, which are newly measured, of the 3D printing object into the artificial neural network model; acquiring an actual measurement value of 3D printing quality by analyzing an actual measurement signal related to the 3D printing object; calculating an error between the prediction value of 3D printing quality derived through the artificial neural network model and the actual measurement value of 3D printing quality; and determining that the 3D printing quality is abnormal when the error calculated exceeds a predetermined tolerance threshold.

8. The method of claim 1, wherein the 'evaluating whether or not a 3D printing quality of the 3D printing object is abnormal' includes: monitoring the actual measurement value of the 3D printing quality; and determining that the 3D printing quality is abnormal when the actual measurement value of the 3D printing quality is not a value within a predetermined allowable range.

9. The method of claim 1, wherein the 'evaluating whether or not a 3D printing quality of the 3D printing object is abnormal' includes: monitoring whether or not a defect including at least one of an internal void and a surface crack is generated in the 3D printing object by analyzing a thermal image and an ultrasonic signal; and determining that the 3D printing quality is abnormal when existence of the defect is estimated.

10. The method of claim 1, wherein the feedback controlling of printing quality of the 3D printing object includes: inspecting whether or not the printing quality is normal; performing a feedback control in real-time when the printing quality is abnormal; and adjusting data of process variables of the 3D printing process through a real-time feedback control.

11. The method of claim 1, wherein the process variables can be actively adjusted in the 3D printing process and include at least one of an intensity of the laser beam for the 3D printing, a process speed, a size of the laser beam for the 3D printing, and a discharge amount of the base material.

12. The method of claim 1, wherein the 3D printing quality includes at least one of physical property, defect, and shape of the 3D printing object.

13. The method of claim 1, wherein the measurement signal includes at least one of a thermal image, an ultrasonic signal, a vision camera image, and a sound signal.

14. The method of claim 1, wherein the 3D printing process is a direct energy deposition (DED) based 3D printing process.

* * * * *